United States Patent [19]

Royston

[11] Patent Number: 4,538,841
[45] Date of Patent: Sep. 3, 1985

[54] INSULATED PIPE COUPLINGS

[75] Inventor: James M. Royston, Pittsburgh, Pa.

[73] Assignee: Coupling Systems, Inc., Pittsburgh, Pa.

[21] Appl. No.: 620,429

[22] Filed: Jun. 14, 1984

Related U.S. Application Data

[63] Continuation-in-part of Ser. No. 531,034, Sep. 12, 1983.

[51] Int. Cl.³ .............................................. F16L 17/00
[52] U.S. Cl. ..................................... 285/337; 285/53; 285/343; 285/372; 285/382.7
[58] Field of Search .................... 285/337, 372, 53, 31, 285/382.7, 343, 369

[56] References Cited

U.S. PATENT DOCUMENTS

| | | | |
|---|---|---|---|
| 290,844 | 12/1883 | Bowman | 285/53 X |
| 1,986,357 | 1/1935 | Perry | 285/53 |
| 2,269,695 | 1/1942 | Scharf | 285/53 |
| 3,288,495 | 11/1966 | Newell et al. | 285/337 X |
| 3,594,023 | 7/1971 | Yano | 285/337 |
| 4,070,046 | 1/1978 | Felker et al. | 285/337 |

Primary Examiner—Richard J. Scanlan, Jr.
Attorney, Agent, or Firm—Buell, Ziesenheim, Beck & Alstadt

[57] ABSTRACT

A coupling is provided for spaced coaxial pipe ends to be connected having a sleeve or middle ring with frusto-conical enlarged ends receiving the pipe ends to be connected coaxially thereof, elastomeric gaskets having a frusto-conical portion fitting the ends of the middle ring, follower members bearing on the gaskets to urge them into the middle ring ends, tightening members drawing the follower members toward each other, an insulating sleeve surrounding at least one pipe end with a depending radially inward spacer member and an insulating member having the shape of the follower member between the follower member and the pipe and middle ring and having a flange coaxial of the pipe extending through said follower member around the pipe. An electrical connector means may be metallurgically bonded to the middle ring. In cases when the pipe ends are anchored, one or two back-up rings may be added adjacent one or both followers with frusto-conical jaws in a frusto-conical opening in the back-up ring and an insulating member therebetween. An elastomer seal ring may be placed between the back-up rings and adjacent follower.

14 Claims, 2 Drawing Figures

INSULATED PIPE COUPLINGS

This application is a continuation-in-part of my copending application Ser. No. 531,034, filed Sept. 12, 1983.

This invention relates to insulated pipe couplings and particularly to a coupling for connecting the two ends of anchored pipe to provide all of a seal, a strong grip, moisture protection and either insulation from or continuity of electrical current passage through the coupling.

There are a wide variety of pipe couplings available for gripping and sealing two pipe ends where at least one of the pipes being connected is unanchored and free for at least limited longitudinal movement. Typical of such devices are those disclosed and illustrated in Felker et al. U.S. Pat. No. 4,070,046 and Rieffle et al. U.S. Pat. No. 4,119,335. These devices have a common characteristic, namely, that the gripping ring or member at each end engages the pipe end around which it is placed before the seal ring completes the seal. This requires that the system have at least one unanchored pipe end which is free to move toward the other. Where both pipe ends are anchored and therefore not free to move, the gripping members normally engage the pipe circumferentially in a tight grip before the seal occurs. As a result, further tightening will not complete the seal unless the gripping members slide or the pipe ends move, neither of which can or should occur. As a result, the pipe ends are gripped tightly but not fully sealed.

My copending application Ser. No. 531,034, filed Sept. 12, 1983 solves this problem by providing a couling which provides a middle ring or sleeve and two follower members, one at each end with a frusto-conical elastomer gasket between each follower member and the frusto-conical ends on the middle ring. Tightening bolts draw the follower members toward the middle ring forcing the elastomer gasket into the frusto-conical ends of the middle ring to create a tight seal. The gripping connection is then formed by compressing a frusto-conical split jaw ring having internal teeth into engagement with the pipe ends by either a pair of separate back-up rings having conical inner surfaces acting on the split rings or by a single such back-up ring and a conical surface in one follower member on the end of the middle ring opposite the follower.

There are, however, situations where it is desirable to provide one or all of moisture protection between the follower member and the back-up rings and internal insulating and/or continuity wiring capacity.

The present invention is designed to solve these problems and provide insulating and continuity capacity in such pipe connectors.

In this invention I provide a pipe coupling for connecting two ends of pipe, both of which are anchored remote from the connection including an elongate sleeve adapted to receive coaxially two opposing pipe or tube ends to be connected, said sleeve having frusto-conical enlarged ends, a pair of frusto-conical elastomer sealing gaskets adapted to fit in said frusto-conical ends of the sleeve, a follower member at each end of the sleeve bearing on said gaskets to force them into the frusto-conical ends of the tightening means extending between the follower means acting to move them axially together to force the gaskets into tight sealing engagement with the pipe ends being joined to create a tight seal between the pipe ends being joined and the sleeve, at least one back-up ring spaced from at least one of the follower means and having a frusto-conical opening therein, a frusto-conical radially compressible jaw means in said frusto-conical opening in said back-up ring, surface engaging means on the inside of said jaw means adapted to engage the surface of a pipe end against movement, auxiliary tightening means between the follower means and adjacent back-up ring for drawing said back-up ring axially toward the follower means to force the frusto-conical jaw means into tight radial engagement with said pipe end, an annular elastomer seal ring surrounding the jaw means between the follower means and back-up ring, said seal ring having an axial length such that its ends engage both the follower means and back-up ring when assembled prior to drawing the back-up ring towards the follower means whereby when the back-up ring is drawn towards the follower ring the annular seal ring is compressed axially to form a seal between the follower means and adjacent the back-up ring around the jaw means between them. An insulating sleeve, preferably of nylon, may be provided at one of the follower means to insulate the coupling from the pipe ends. An electrical connector may be attached to the middle ring or sleeve intermediate its ends to receive an electrical connector for continuity wiring.

In the foregoing general description certain objects, purposes and advantages of this invention have been set out. Other objects, purposes and advantages of the invention will be apparent from a consideration of the following description and the accompanying drawings in which.

Figure 1:
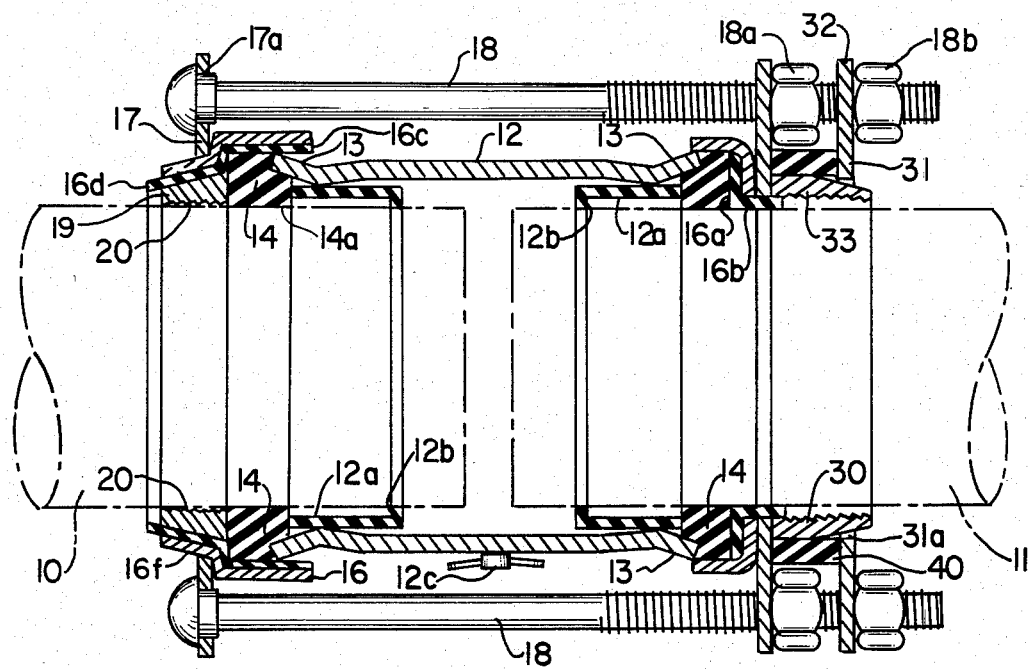
FIG. 1 is a section through a connector according to this invention.

Referring to the drawings I have illustrated in FIG. 1 a pair of pipe ends 10 and 11 to be connected. The opposite ends of the two pipes are anchored (not shown) so that the pipe ends cannot move toward each other. A sleeve or middle ring 12 having a slightly larger internal diameter than the external diameter of pipes 10 and 11 is placed coaxially around pipe ends 10 and 11 to be connected. Each end of sleeve 12 has a flared or frusto-conical portion 13 receiving an elastomeric gasket 14 having a short cylindrical portion and a frusto-conical end portion 14a adapted to fit in flared end 13 of sleeve 12. The elastomeric gasket is adapted to fit snugly around pipe ends 10 and 13 to be joined. An annular cup shaped follower 16 surrounds each pipe end 10 and 11, abuts gasket 14 and is provided with radial lugs 17 having holes 17a receiving bolts 18 with tightening nuts 18a for drawing the followers axially toward the sleeve to force the gaskets into the frusto-conical ends of sleeve 12 and into sealing engagement with the outside surfaces of pipe ends 10 and 11. In connectors where sealing alone is required and it is desired to insulate the pipe ends from the sleeve, then an insulator sleeve 12a is inserted into the open center of the sleeve or middle ring 12 from the frusto-conical end. Preferably, insulating sleeve 12a has a depending flange 12b at its innermost end to space it from the pipe and aid in insulating it from the middle ring 12. A second insulating member 16a is inserted into follower 16 around the pipe end. This member has the cup shape of the follower and a flange 16b which extends through the opening of follower 16 around the pipe end. In addition to the insulator an electrical connector 12c may be metallurgically bonded to the exterior of the sleeve or middle ring 12.

In the structure of this invention one of the followers 16 may be provided with a generally frusto-conical opening 16f receiving the frusto-conical split jaw 19 or its equivalent in separate connected jaw members. The jaw 19 has toothed grooves 20 adapted to engage the surface of pipes 10 and 11. The jaw 19 may bear against gasket 14 or against an intermediate washer (not shown). When the followers 16 are drawn together by bolts 18 and nuts 18a the jaw means 19 is compressed by the frusto-conical opening 16f of follower 16 into tight engagement with the exterior of one of the pipe ends 10 as shown forcing toothed grooves 20 into the surface of the pipe to hold it against withdrawal from the pipe. In order to insulate such an end connection I provide an insulating sleeve 12a of nylon or the like, as described above, inserted into the open end of the middle ring 12 from the frusto-conical end. Again, the insulator sleeve 12a is preferably provided with a depending flange 12b at its innermost end to space it from the pipe and aid in insulating the pipe from the middle ring. A second insulating member 16c of nylon or similar insulating plastic of good strength, is inserted into the follower 16 between follower 16 and jaw means 19. This member has the cup shape of the follower with a frusto-conical portion 16d lying between the frusto-conical opening in the follower and the jaw means 19. When the gaskets 14 and jaw 19 have been completely tightened into position a second frusto-conical jaw means 30 similar to split jaw 19 is placed in abutment against the follower means 16, opposite jaw means 19. A back-up ring 31 similar to followers 16 having a frusto-conical opening 31a is placed over the jaw means 13. Radial lugs 32 with holes 32a receiving the threaded ends of bolts 18 are formed on the periphery of back-up ring 31. Nuts 18b draw the back-up ring 31 tightly over jaw means 30 with opening 31a compressing the jaw means 30 tightly around pipe end 11 so that toothed grooves 33 are forced into the surface of the pipe and to hold it against withdrawal.

It is also desirable at times when a back-up ring is used to provide a moisture seal between the back-up ring 31 and the next adjacent follower 16 to provide some corrosion protection. To accomplish this I provide an elastomer sleeve 40 of generally cylindrical form inserted over the pipe end between back-up ring 31 and adjacent follower 16 so that when nuts 18b are tightened the back-up ring is moved toward follower 16 to compress sleeve 40 longitudinally and provide a seal against ingress of dirt and moisture.

In those embodiments of the invention in which both ends of the coupling are provided with back-up rings 31 adjacent followers 16, one can provide the insulating sleeve 12a and member 16c at both ends.

Similarly, the moisture seal sleeve 40 can also be provided at both ends of such a coupling regardless of whether the insulating sleeve and member are used or not.

Figure 2:
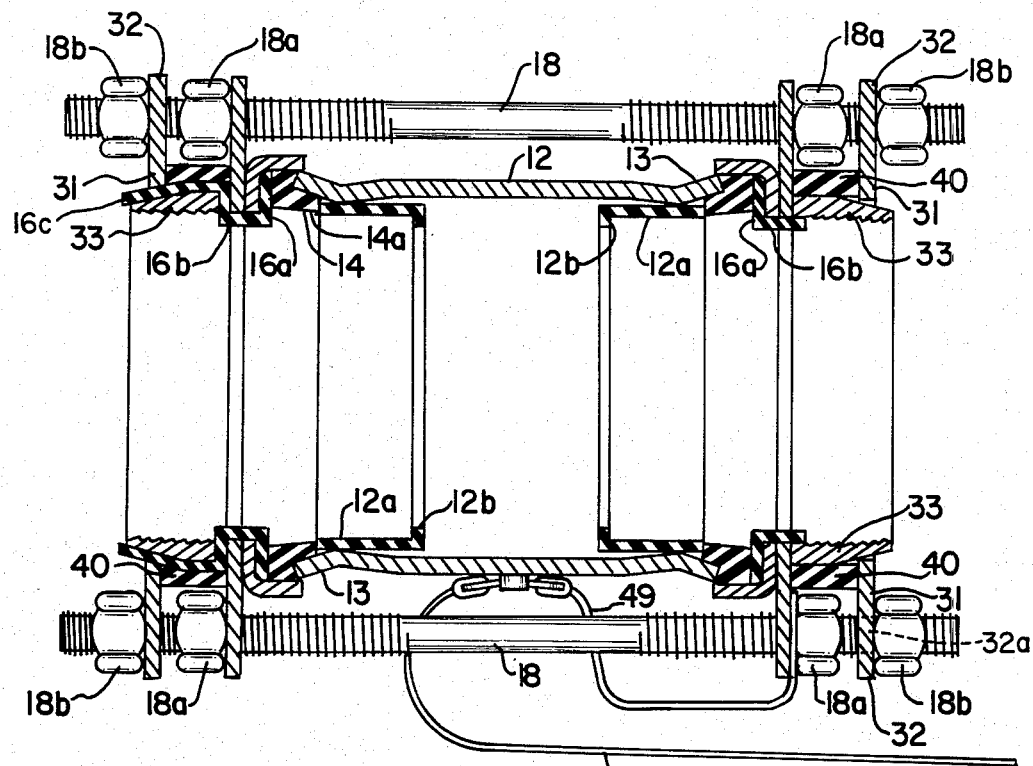
FIG. 2 is a partial section through a second embodiment of a connector according to this invention.

In FIG. 2 I have illustrated a connector according to my invention in which both ends of the coupling are provided with back-up rings and in which I show electric connector 12c metallurgically bonded to sleeve or middle ring 12 and connected with a ground wire 49 and shunt wire 50 which may be welded to the steel pipe or otherwise used to electrically connect the parts of the pipe line.

In the foregoing specification I have set out certain preferred practices and embodiments of my invention, however, it will be understood that this invention may be otherwise embodied within the scope of the following claims.

I claim:

1. A coupling for joining two spaced coaxial pipe ends anchored against longitudinal movement comprising an elongate sleeve adapted to receive coaxially two opposing pipe ends to be connected, said sleeve having frusto-conical enlarged ends opening outwardly, a pair of cylindrical elastomeric gaskets having frusto-conical end portions adapted to fit in the frusto-conical ends of said sleeve in sliding engagement around the pipe ends to be connected, a follower member bearing on each of said gaskets to force them into the sleeve ends, tightening means acting on the follower member to move at least one of the follower members toward the other axially whereby the gaskets are forced into the frusto-conical ends of the sleeve in sealing engagement with said ends and the pipe ends to be connected, an insulating generally cylindrical sleeve means surrounding at least one of said pipe ends between said pipe end and said elongated sleeve, said insulating sleeve having radially inwardly extending spacer means spacing said insulating sleeve from the pipe, at least one of said follower members having a frusto-conical opening surrounding the pipe ends being connected, said opening in said at least one follower member having its large end opening toward the large end of the frusto-conical end of said sleeve, a frusto-conical split jaw member permitting expansion and contraction thereof around one of said pipe ends to be connected with the frusto-conical opening in said at least one follower, surface engaging means on the jaw member adapted to engage the outer surface of said one pipe end and an insulating member provided in said follower member having a frusto-conical opening, said insulating member having the shape of the follower member and with an annular frusto-conical flange corresponding to the frusto-conical opening of said follower member and adapted to extend through said opening between the follower member and jaw member.

2. A coupling as claimed in claim 1 wherein a back-up ring is provided at the end opposite said one follower means spaced from the other follower means, said back-up ring having a frusto-conical opening therein surrounding the other pipe end, a second frusto-conical jaw means in said frusto-conical opening in the back-up ring and surrounding said other pipe end, surface engaging means on said second jaw means adapted to engage the exterior surface of said other pipe end and auxiliary tightening means between the other follower means and the back-up ring for drawing said back-up ring axially toward the said other follower means to force the second frusto-conical jaw means into tight radial engagement with said other pipe end.

3. A coupling as claimed in claim 1 wherein the insulating sleeve and insulating member are made of nylon.

4. A coupling as claimed in claim 1 wherein the elongate sleeve carries a metallurgically bonded electrical connector.

5. A coupling as claimed in claim 4 wherein the electrical connector is bifurcated.

6. A coupling as claimed in claim 1 or 3 or 4 or 5 having a back-up ring surrounding each pipe end spaced from each of said follower members opposite the elongate sleeve, each said back-up ring having a frusto-conical opening therein surrounding the other pipe end, a second frusto-conical jaw means in said frusto-conical opening in the back-up ring and surrounding said other pipe end, surface engaging means on said second jaw means adapted to engage the exterior surface of said other pipe end and auxiliary tightening means between the other follower means and the back-up ring for drawing said back-up ring axially toward the said other follower means to force the second frusto-conical jaw means into tight radial engagement with said other pipe end.

7. A coupling for joining two spaced coaxial pipe ends anchored against longitudinal movement comprising an elongate sleeve adapted to receive coaxially two opposing pipe ends to be connected, said sleeve having frusto-conical enlarged ends opening outwardly, a pair of cylindrical elastomeric gaskets having frusto-conical end portions adapted to fit in the frusto-conical ends of said sleeve in sliding engagement around the pipe ends to be connected, a follower member bearing on each of said gaskets to force them into the sleeve ends, tightening means acting on the follower member to move at least one of the follower members toward the other axially whereby the gaskets are forced into the frusto-conical ends of the sleeve in sealing engagement with said ends and the pipe ends to be connected, an insulating generally cylindrical sleeve means surrounding at least one of said pipe ends between said pipe end and said elongated sleeve, said insulating sleeve having radially inwardly extending spacer means spacing said insulating sleeve from the pipe and an insulating member having the shape of the follower members between at least one follower member, the elastomeric gasket and pipe, said insulating member having an annular flange coaxial with the pipe extending through the opening in the follower member between the follower member and the pipe, at least one of said follower members having a frusto-conical opening surrounding the pipe ends being connected, said opening in said at least one follower member having its large end opening toward the large end of the frusto-conical end of said sleeve, a frusto-conical split jaw member permitting expansion and contraction thereof around one of said pipe ends to be connected with the frusto-conical opening in said at least one follower, and surface engaging means on the jaw member adapted to engage the outer surface of said one pipe end, a back-up ring provided at the end opposite said one follower member spaced from the other follower member, said back-up ring having a frusto-conical opening therein surrounding the other pipe end, a second frusto-conical jaw means in said frusto-conical opening in the back-up ring and surrounding said other pipe end, surface engaging means on said second jaw means adapted to engage the exterior surface of said other pipe end and auxiliary tightening means between the other follower member and the back-up ring for drawing said back-up ring axially toward the said other follower member to force the second frusto-conical jaw means into tight radial engagement with said other pipe end, and having a generally cylindrical elastomer seal ring sealingly compressed between the back-up ring and adjacent follower member around the pipe end.

8. A coupling as claimed in claim 7 wherein the insulating sleeve and insulating member are made of nylon.

9. A coupling as claimed in claim 7 wherein the elongate sleeve carries a metallurgically bonded electrical connector.

10. A coupling as claimed in claim 9 wherein the electrical connector is bifurcated.

11. A coupling for joining two spaced coaxial pipe ends anchored against longitudinal movement comprising an elongate sleeve adapted to receive coaxially two opposing pipe ends to be connected, said sleeve having frusto-conical enlarged ends opening outwardly, a pair of cylindrical elastomeric gaskets having frusto-conical end portions adapted to fit in the frusto-conical ends of said sleeve in sliding engagement around the pipe ends to be connected, a follower member bearing on each of said gaskets to force them into the sleeve ends, tightening means acting on the follower member to move at least one of the follower members toward the other axially whereby the gaskets are forced into the frusto-conical ends of the sleeve in sealing engagement with said ends and the pipe ends to be connected, an insulating generally cylindrical sleeve means surrounding at least one of said pipe ends between said pipe end and said elongated sleeve, said insulating sleeve having radially inwardly extending spacer means spacing said insulating sleeve from the pipe and an insulating member having the shape of the follower members between at least one follower member, the elastomeric gasket and pipe, said insulating member having an annular flange coaxial with the pipe extending through the opening in the follower members between the follower members and the pipe, a back-up ring surrounding each pipe end spaced from each of said follower members opposite the elongate sleeve, each said back-up rings having a frusto-conical opening therein surrounding each pipe end, a frusto-conical jaw means in said frusto-conical opening in the back-up ring and surrounding each said pipe end, surface engaging means on said jaw means adapted to engage the exterior surface of each said pipe end and auxiliary tightening means between the other follower member and the back-up ring for drawing said back-up ring axially toward the said other follower member to force the frusto-conical jaw means into tight radical engagement with each said pipe end, and a second insulating member configured so as to extend between said jaw means, said back-up ring and said other follower, and a generally cylindrical elastomer seal ring sealingly compressed between the back-up ring and adjacent follower member around the pipe end.

12. A coupling as claimed in claim 11 wherein the insulating sleeve and insulating member are made of nylon.

13. A coupling as claimed in claim 10 wherein the elongate sleeve carries a metallurgically bonded electrical connector.

14. A coupling as claimed in claim 13 wherein the electrical connector is bifurcated.

* * * * *